United States Patent
Cooper

(10) Patent No.: US 6,377,702 B1
(45) Date of Patent: Apr. 23, 2002

(54) COLOR CAST DETECTION AND REMOVAL IN DIGITAL IMAGES

(75) Inventor: Ted J. Cooper, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 91 days.

(21) Appl. No.: 09/618,205

(22) Filed: Jul. 18, 2000

Related U.S. Application Data

(60) Provisional application No. 60/169,828, filed on Dec. 8, 1999.

(51) Int. Cl.[7] .................................................. G06K 9/00
(52) U.S. Cl. ........................ 382/167; 382/172; 358/522
(58) Field of Search ................................. 382/162, 164, 382/167, 168, 171, 172, 274, 275, 169; 358/518, 522, 520; 345/589, 604

(56) References Cited

U.S. PATENT DOCUMENTS

| | | | | |
|---|---|---|---|---|
| 5,495,428 A | | 2/1996 | Schwartz | 364/526 |
| 5,668,890 A | * | 9/1997 | Winkelman | 345/604 |
| 5,748,802 A | * | 5/1998 | Winkelman | 382/169 |

* cited by examiner

Primary Examiner—Phuoc Tran
(74) Attorney, Agent, or Firm—Mikio Ishimaru

(57) ABSTRACT

Digital images often have undesired color casts due to unusual illuminant sources. A color correction method is provided that uses adaptive segmentation to identify the presence of such casts, estimate their chromatic strength, and alter the image's near-neutral-color regions to compensate for the cast. The method identifies most major objects in a scene and their average color. A color space having an achromatic axis is provided with a default gray radius that is used for establishing bins of neutral color in a chromatic plane. The bins are populated with the pixels of the digital color image based on pixel chromaticity. A color histogram computed with chromaticity peaks for the pixels in the bins within the default gray radius. The default gray radius is adjusted to a gray radius based on the chromaticity peaks in the color histogram. The color cast is detected from a dominant chromaticity peak, or two chromatic peaks in the same chromatic quadrant, within the gray radius and color cast distance from the distance thereof from the achromatic axis. The color cast is removed from the pixels by subtracting the color cast distance from the color image in the color space and outputting a color cast removed color image.

32 Claims, 4 Drawing Sheets

COLOR CAST DETECTION AND REMOVAL IN DIGITAL IMAGES

CROSS-REFERENCE TO RELATED APPLICATION

This application claims the benefit of and incorporates herein by reference thereto U.S. Provisional Patent Application Serial No. 60/169,828, entitled "A Novel Approach to Color Cast Detection and Removal in Digital Images" by Ted J. Cooper, which was filed Dec. 8, 1999.

TECHNICAL FIELD

The present invention relates generally to digital images and more particularly to color cast detection and removal in digital images.

BACKGROUND

Digital Still Cameras (DSC) have significant limitations in color representation because little is known about the scene illuminants during a scene capture except for an overall exposure measurement. Many attempts to estimate the scene illuminants have been reported in the literature. The simplest approach, called the gray world approximation, assumes that the average of all surface reflectances in a scene is gray. It follows from this assumption that if any average color remains after reflecting from an average gray surface, it must be the color of the illumination. When scenes are encountered where the gray world approximation is not valid, then its use typically causes color casts in the resulting images. To achieve better results, more sophisticated algorithms for the estimation of the illuminant were developed. The most widely used color correction method is the Von Kries transformation. The red-green-blue, or RGB, values of an image are divided by the estimated illumination and then multiplied by the RGB values of a reference illumination. Other illumination estimation methods involve measuring specific color regions where ensemble averages are gathered and then classified upon various forms of chromaticity charts. Using numerous color distance metrics, these estimation methods search for dominant color skews away from the gray world approximation to predict the scene illumination.

DSC manufacturers typically invoke elements from several methods in the method known as White Balance (WB). The goal of WB is to produce an image where white objects appear white, and the visual affects of non equi-energy illuminants are minimized. When WB is not properly attained, distinct color casts result in the image (for example, a yellow color cast in digital still images when late afternoon sun was present). The WB task typically starts with a Von Kries correction, applied to all the pixels of the image, which balances the amplifier gains for the RGB sensor array based on some illumination estimation assumption from the methods previously mentioned. In addition, an ad-hoc adjustment typically is made to force an image's maximum luminance value to pure white (e.g., R=G=B=1.0). Some cameras also adjust the minimum luminance to set the black point to an equal energy level (e.g., R=G=B≅0.01) that is not absolute black. For well-lit outdoor scenes, most DSC cameras have the black point set to absolute black (R=G=B=0.0), usually because of exposure considerations. The movement of image white point and black point regions towards predefined goals (usually with associated tone controls) typically produces pleasing peak highlight and shadow areas. However, it provides no additional compensation for the majority of pixel information contained in the ¼ to ¾ color tones. The resulting images can show significant color casts in over half an image. Since the image white point (and possibly the black point) is altered in a very nonlinear way during image capture, only limited illuminant information remains in the camera data available for post-processing.

If the original image white and black points were left unaltered during image capture, it is possible to rotate the image color space so that the core line joining the white to the black point permits this core line to be aligned with the achromatic axis.

Referring now to FIG. I (PRIOR ART), therein is shown schematically the prior art color cast detection and removal method, called the "gray axis realignment" method 10, described above in a L*a*b* color space, where "L" is the luminance value on a L* luminance or achromatic axis 12 and "a*" and "b*" are chrominance values on a* and b* chrominance axes 14 and 16, respectively. An original image has a white point 17, a black point 18, and a core line 20 extending from the white point 17 to the black point 18. An arrow 22 indicates a rotation of the core line 20 to line up with the achromatic axis 12 with relocated white point 22 and relocated black point 24. A cylindrical neutral-color core 28 indicates what remains after the core line 20 rotation.

This method assumes the scene peak illuminant area is really an achromatic highlight —a fact that is borne out in most real life photographs. However, some professional cameras have a special purpose manual white balance mode that does not adjust the peak illuminant pixels to a pure white. Data was captured in this method from a MacBeth Spectralight III booth under various illuminant conditions (D50, D65, Cool White fluorescent, Horizon daylight, U30 fluorescent, and incandescent A). A simple post-data capture algorithm rotated the core line 20 extending from the white point 17 to the black point 18 in L*a*b* color space until it was on the achromatic axis 12. The results showed a marked decrease in image color cast as measured by the achromatic purity of the MacBeth Color Chart gray patches contained in the test samples under the various illuminants. Unfortunately, the gray axis realignment method is critically dependent on knowing the chromaticity of the highest illuminant point in the image. Small changes about the white point 17 produce visually noticeable effects in the near-neutral-colors for the rest of the image although the placement of the black point 18 was not nearly as critical since little chromatic content was found in the cameras examined.

DISCLOSURE OF THE INVENTION

The present invention provides a method of color cast detection and removal of a color image consisting of color pixels. A color space having an achromatic axis is provided with a default gray radius, which is used for establishing bins of neutral color in a chromatic plane. The bins are populated with the pixels based on pixel chromaticity. A color histogram is computed with chromaticity peaks for the pixels in the bins within the default gray radius. The default gray radius is adjusted to a gray radius based on the chromaticity peaks in the color histogram. The color cast is detected from a dominant chromaticity peak within the gray radius and color cast distance from the distance thereof from the achromatic axis. The color cast is removed from the pixels by subtracting the color cast distance from the color image in the color space and outputting a color cast removed color image.

The present invention provides a method of color cast detection and removal of a color image consisting of color pixels. A color space having an achromatic axis is provided with a default gray radius, which is used for establishing bins of neutral color in a chromatic plane. The bins are populated with the pixels based on pixel chromaticity. A color histogram is computed with chromaticity peaks for the pixels in the bins within the default gray radius. The default gray radius is adjusted to a gray radius based on the chromaticity peaks in the color histogram. The color cast is detected from a plurality of chromatic peaks in the same chromatic quadrant within the gray radius and color cast distance from the mean average distance thereof from the achromatic axis. The color cast is removed from the pixels by subtracting the color cast distance from the color image in the color space and outputting a color cast removed color image.

While the gray axis realignment method works well for conditions where the peak image illuminant pixels are not adjusted, it has little real world application since most DSC devices alter the brightest pixels of an image in some way. The color cast detection and removal method of the present invention overcomes this limitation by examining the chromaticity of large contiguous, nearly gray objects distributed throughout the image.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
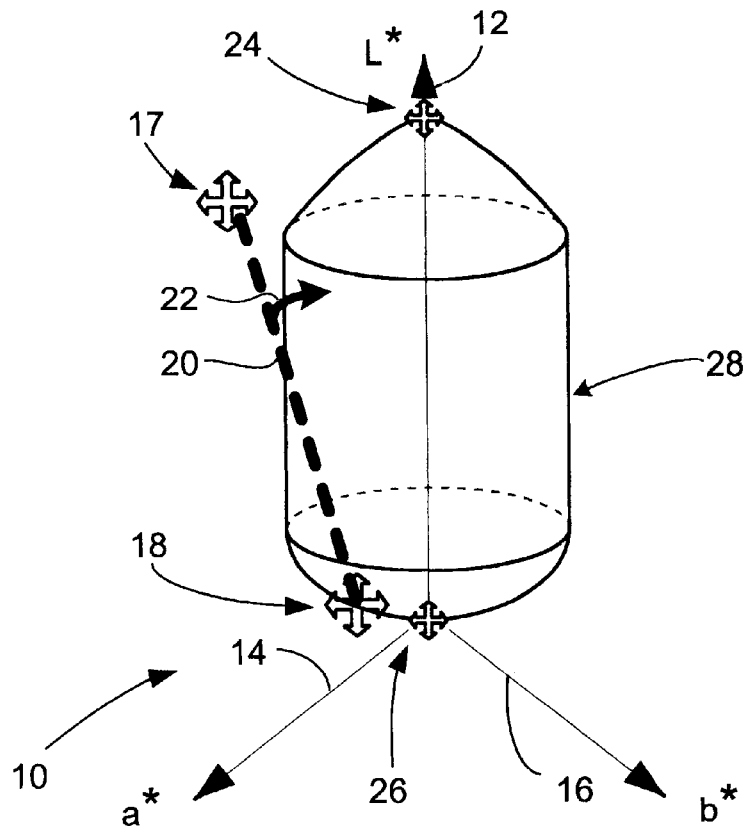
FIG. 1 (PRIOR ART) schematically shows a prior art color cast detection and removal method.

While the gray axis realignment method 10 of FIG. 1 works well for conditions where the peak image illuminant pixels are not adjusted, it has little real world application since most DSC devices alter the brightest pixels of an image in some way. The color cast detection and removal method of the present invention overcomes this limitation by examining the chromaticity of large contiguous nearly gray objects distributed throughout the image.

Figure 2:
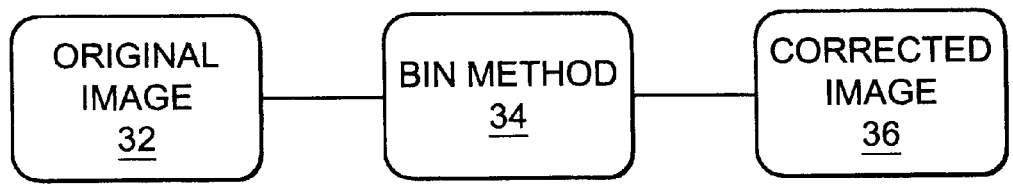
FIG. 2 shows the overview of the digital image system incorporating the present invention.

Referring now the FIG. 2, therein is shown an overview of the digital image system 30 in which the present invention is used. The digital image system 30 includes an original image 32, which is processed by a bin method 34 of the present invention to produce a corrected image 36.

The system concept is that while the brightest pixels in the image may have been compromised, all of the other near-neutral-pixels retain their original chromatic properties. The fundamental system concept is to carefully select all of the pixels representing almost-gray objects and identify their average color objects, the algorithm of the present invention looks for evidence that either there is an overall color cast common to all the objects or that the objects have randomly dispersed color vectors. The algorithm is sensitive to the possibility that the image has no "almost-gray" objects or that the entire scene is dominated by a single large colorful object (this is often referred to as the "red barn" image). If a common color component is found present in all of the near-neutral-color objects, its magnitude is estimated and the inverse of that chromaticity is applied to all of those objects. The correction mechanism has the basic structure of an International Color Consortium (an international standards organization) profile implementing a three-dimensional Lookup Table (LUT). The profile can be directly applied to the test image, or it can be written to a disk file so that it can be applied to multiple images that have similar color cast characteristics.

Figure 3:
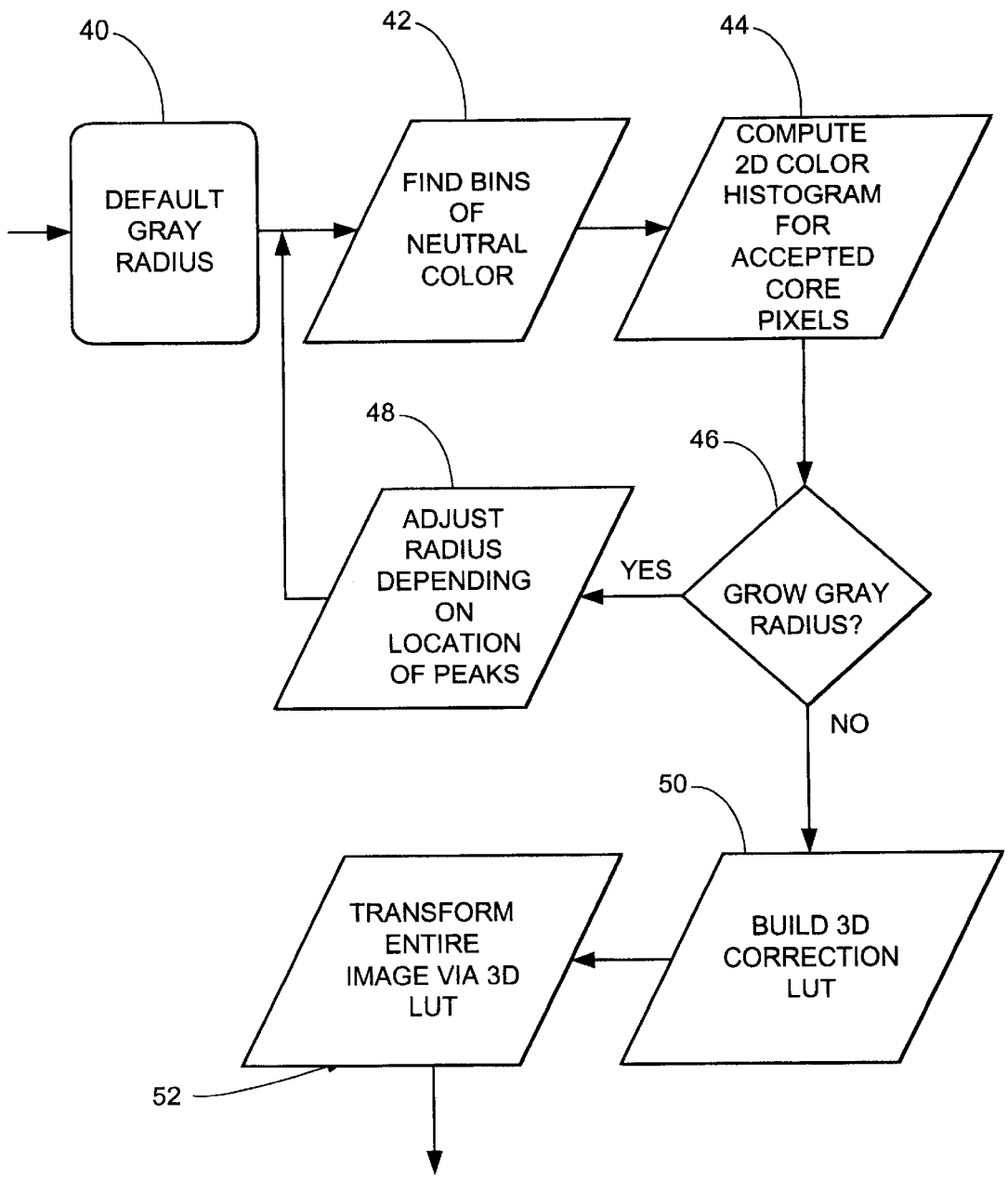
FIG. 3 shows the method of color cast detection and removal in accordance with the present invention.

Referring now to FIG. 3, therein is shown the bin method 34 of the color cast detection and removal method of the present invention. The original image is input from the block 32 of FIG. 2 into a "default gray radius" block 40, which provides a starting point gray color core cylinder. The bin method 34 then proceeds to "find bins of neutral-colors" block 42. From the block 42, the bin method 34 proceeds to "compute 2D color histogram for accepted core pixels" block 44. From block 44, the bin method 34 proceeds to "grow gray radius" decision block 46 where it is decided whether to continue to grow the gray radius because additional peaks have been encountered or because the amplitudes of the peaks still vary. If "yes", the bin method 34 proceeds to "adjust radius depending on location of peaks" block 48 and returns to the "find bins of neutral-colors" block 42 for another iteration. If "no", the bin method 34 proceeds to "build 3D correction LUT" block 50 to build a lookup table (LUT) with correction factors for each color. Next, the LUT is used to apply the correction factors to remove the color cast in the color image in "transform entire image via he LUT" block 52. The bin method 34 then is "done" and outputs the corrected image to the lock 36 of FIG. 2.

Note that the bin method 34 is implemented in an algorithm which is iterative as it attempts to select the correct color bin range to just encompass each image object (in the ear-neutral-color region). The goal of the iterative method is to find the smallest chromatic radius where all of the near-neutral-color objects have been collected into the appropriate color space bins and any color peaks found in the color bins are stable. Stability is measured by the absence of additional peaks encountered for small changes in the chromatic radius and relatively constant amplitudes of the peaks (which are a measure of the number of pixels contained in the segmented regions). When the bin selection parameters reach a given level of stability, then the minimum set of near-neutral-color objects has been identified and the best possible measure of their average color reached. The distribution of the color space coordinates (vectors) of these objects determines if a cast is present and its magnitude. The distribution can also indicate that the image contains multiple randomly dispersed color vectors, implying that no correction is required. Similarly, the distribution can demonstrate the presence of large objects of constant color (the "red barn" condition). In such a case, the algorithm will defer from imputing a color cast.

Figure 4:
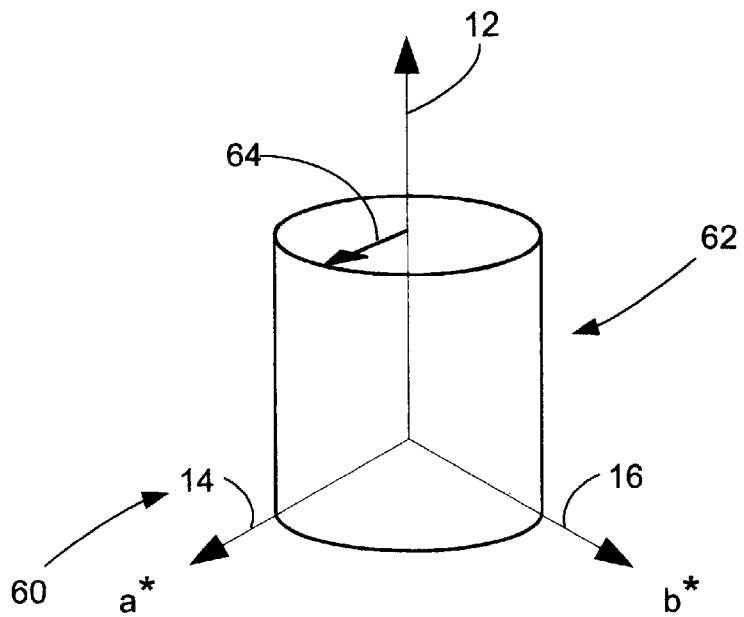
FIG. 4 shows the default gray radius selection in accordance with the present invention.

Referring now to FIG. 4, therein is shown the default gray radius selection 60 of "default gray radius" block 32 of FIG. 3 in accordance with the present invention on L*a*b* axes 12, 14, and 16, respectively. The gray region, not including the white and black points, is shown as a cylindrical neutral-color core 62 having a gray radius 64. In the best mode, the default starting values are a* =b* =15 Commission Internationale de l'Éclairage (CIELAB) units. The maximum radius is has been found to be about 40 CIELAB units because the image is typically saturated in color beyond this limit.

Figure 5:
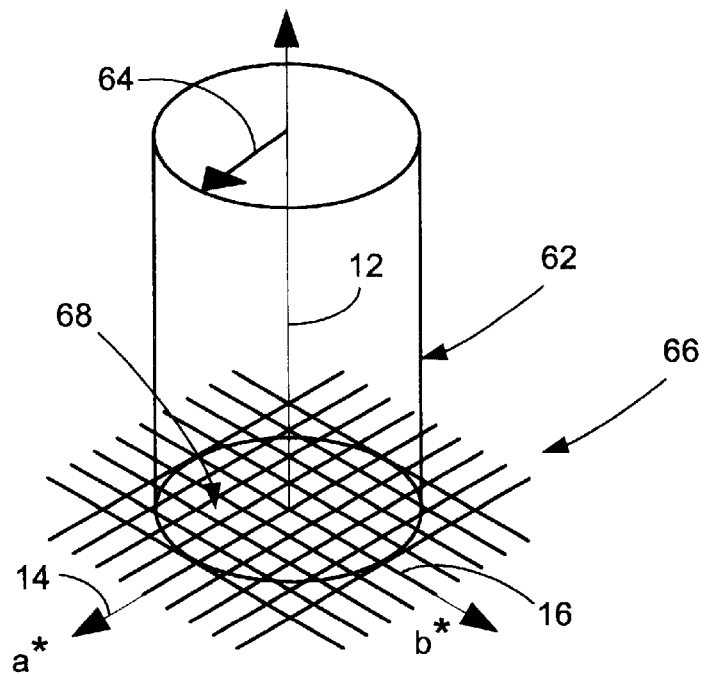
FIG. 5 shows the finding of bins of neutral-color in accordance with the present invention.

Referring now to FIG. 5, therein is shown the setup of color bins 66 of neutral-color of "find bins of neutral-colors" block 42 of FIG. 3 in accordance with the present invention. In FIG. 5, an 8 by 8 grid defines color bins, for example color bin 68, of the neutral-color core 62 where the statistical counts of the color segments will be compiled. The number of color bins 66 increases with increases in the gray radius 64. The goal is to find eight to twenty colors of near-neutral-color that hold a large percentage of the image and white areas that have noticeable casts.

In pixel selection, it was originally thought that all pixels in an image found within some central range of luminances and chrominances should be sorted into color bins to identify objects. The rational for limiting luminance levels was that "brightest pixel" corrections (and possible black point alterations) yielded near-neutral-color objects that were not characteristic of the true color of the scene. After experimentation with an image database, it quickly became apparent that luminance limitations did not alter the cast detection in any significant way. More importantly, the experimentation demonstrated that real images contain a large number of pixels representing small isolated objects like shirt buttons, pens and pencils, or lace collars. These objects are quite small compared to a scene's dominant object such as a person's suit, a car, or a desktop. Color cast information is concentrated in the large dominant objects of a scene. These dominant objects oftentimes are not the subject of the image (e.g., a gray wall that is the background of a couple's portrait), but their sheer size and relatively constant color dominate a viewer's impression of a scene. Empirically, the best metric for a near-neutral-color object is something of near-constant surface reflectance that occupies at least 1% of the image pixel count. It is primarily the large objects that give a meaningful sample of the illuminant of a surface in determining if a particular color cast is present.

It is assumed that the large objects have multiple brightness levels distributed across possibly curved surfaces. The goal of the algorithm of the bin method 34 is to permit a heuristic adjustment of color bin luminance and chrominance constraints to account for changes across an object. If a sample image consisting of hundreds of small dissimilar objects is encountered, then the algorithm indicates no large objects are present because of the small pixel count in each color bin. An example of a "Where's Waldo" picture would probably be rejected except for the possibility that a constant color background runs around each object and could account for 1% of the pixel population. Almost all outdoor natural scenes pass the criterion for large near-neutral-color objects. This probably results from the fact that sky, grass, cement, water, and ground cover generally dominate outdoor scenery. Indoor scenes can fail when textured or patterned objects dominate. No failure was found when portraits of humans were present because skin tone from faces and arms generally fall into the near-neutral-color object category and typically consume 5% to 50% of an image.

Figure 6:
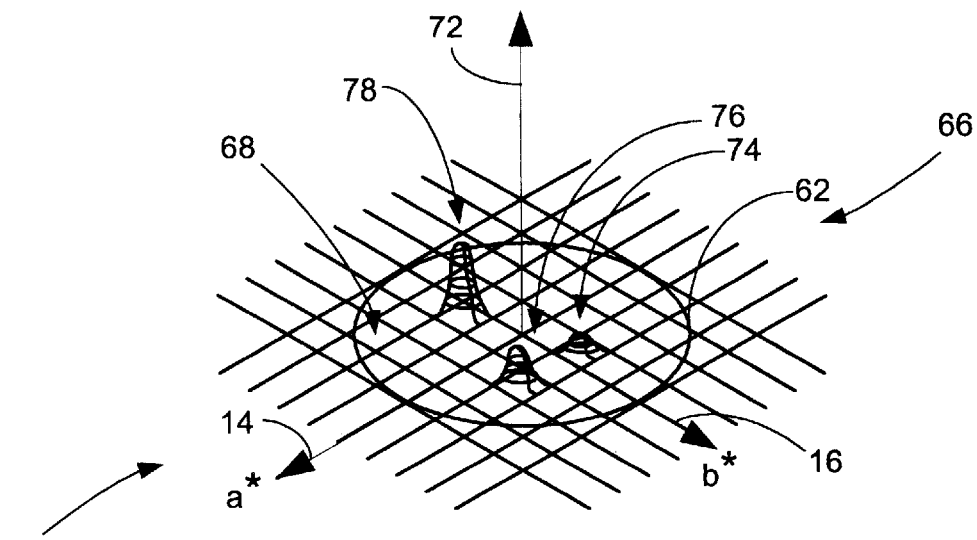
FIG. 6 shows the computation of a histogram in accordance with the present invention.

Referring now to FIG. 6, therein is shown a global chrominance histogram map 70 for the "compute 2D color histogram for accepted core pixels" block 44 in accordance with the present invention. The histogram map 70 has chromatic axes 14 and 16 and a pixel count axis 72. In a typical image, the color distribution of segmented objects form distinct and separate peaks 74, 76, and 78 in the neutral-color core 62. If peaks 74, 76, or 78 are distinct, the decision is made in "grow gray radius" decision block 46 of FIG. 3 not to grow the gray radius 64. It should be noted that the color bins 66 are used only to predict and adjust the future growth of the gray radius 64.

The algorithm starts by creating the global chrominance histogram map 70 of all pixels whose chrominances fall within the center half of the color space range. For the L*a*b* color space with 8-bit signed coordinates, this corresponds to objects closest to the neutral-color core where $|a^*|<64$ and $|b^*|<64$. This a* and b* 2D histogram map 70 is used to identify if the near-neutral-color objects found in the segmentation method have common chromatic components. Next, the algorithm begins segmentation by rejecting any 2 by 2 neighborhood of pixels, which do not have at least 3 pixels within a default range of luminance and chrominance values. As will be discussed later, the algorithm works in almost any color space that has one luminance and two chrominance coordinates. A 3 out of 4 pixel criterion (for the 2 by 2 neighborhood) rejects roughly 30% of all image pixels because small objects and edges usually cannot satisfy this constraint. The goal of this part of the algorithm is to quickly reduce the number of pixels that will be processed in subsequent steps and to select only large objects of near-constant reflectance.

Those 2 by 2 pixel groups that pass the previous conditions are assigned to a color bin, such as bin 68, and the range of luminances and chrominances computed. When a significant number of color bins 66 have been collected, then a compaction search is undertaken to join bins whose luminance and chrominance ranges are compatible and have proximate ranges of colors. The goal is to reduce the number of color bins 66 to more easily manipulated number of color ranges. A compacted set of color ranges around 20 has been found to be optimal. The growth of the luminance and the two chrominance channels to accommodate the compaction method constitutes the first set of the iterative feedback parameters. The compacted bins now have new luminance and chrominance ranges computed plus a new average color. In addition, the coordinates of all pixels involved are stored in the newly created bin. This method continues until the entire image has been processed.

Segmentation begins once the compacted set of color ranges has been reduced to 20 or less compacted bins. The goal of segmentation is to detect large objects of a common surface reflectance. Natural objects are typically curved and have changes in brightness and color across their surface. Segmentation allows neighboring pixels in an object to be joined together despite sizeable changes in luminance and chrominance because these changes occur in a smooth way, as would be representative of real objects.

The segmentation method proceeds as follows. Each color bin is sorted by image x, y coordinates to determine if it is 8-way connected to another pixel group belonging to the same color group. Segmentation bins are created that contain these pixels, their coordinates, individual colors, and group colors. An algorithm parameter allows inclusion of pixel groups who are offset by one or more pixels away from their neighboring 8-way connected pixels. Experimental results indicate that spatial offsets of zero and one provide the best results. Two or more segmentation bins can be spawned from a single color bin when the elements are not spatially connected; e.g., the right and left arm of a person. The segmentation method concludes with an arrangement of pixels in ascending rows of neighboring pixels in left to right runs. This permits the simple calculation of the centroid of each near-neutral-color object, as well as the total area the object subtends (including internal pixel islands that were not part of the segment group but entirely surrounded by pixel members). This information allows an accurate estimation of an object's size, even when things like shirt buttons and pens are present on another object such as a shirt. Objects of near-neutral-color chrominance are well classified. The segmentation routine does not include object boundaries. Edges tend to have very distinct color changes (for curved or rectangular objects) at the interface, and there is a high probability that 3 out of 4 of the pixels in a boundary neighborhood do not have similar colors (which eliminates them in the pixel selection stage).

The absence of boundary edges turns out to be a benefit of this algorithm. If one wishes to quickly find object boundaries, one only needs to search for the voids that are four pixels wide between objects. By following the voids (where object pixels exist on each side), one quickly traverses the boundary of near-neutral-colored objects. In seeking to find the boundaries of objects with high chromaticity, the criterion only needs to be inverted on the pixel selection stage to consider only 2 by 2 neighborhoods with high chromaticity. This type of segmentation works very well because high chrominance objects have very sharp borders.

Once all the segment bins are populated and compressed, the algorithm measures the global chrominance histogram map 70 to determine how many individual chromaticity peaks occur in the near-neutral-color region. If a peak is detected whose chromaticity radius is greater than that allowed during the pixel selection stage, then the radius of the chromaticity selection for the 3 out of 4 pixel criterion is increased to encompass that peak. In addition to the parameter set for the chromaticity radius, it is also possible to change two other parameter sets in the iterative feedback method. The second parameter set is for the initial bin range of luminance and chrominance, and the third parameter set is for the maximum growth of any color bin from its initial bin range.

Extensive testing has shown that only the gray radius 64 for the pixel selection stage needs to be altered to achieve a stable color cast result. The other two parameter sets quickly converge on the same result and are held constant to increase computational speed. Typically, only one or two iterations are needed to reach a stable color cast distance.

Figure 7:
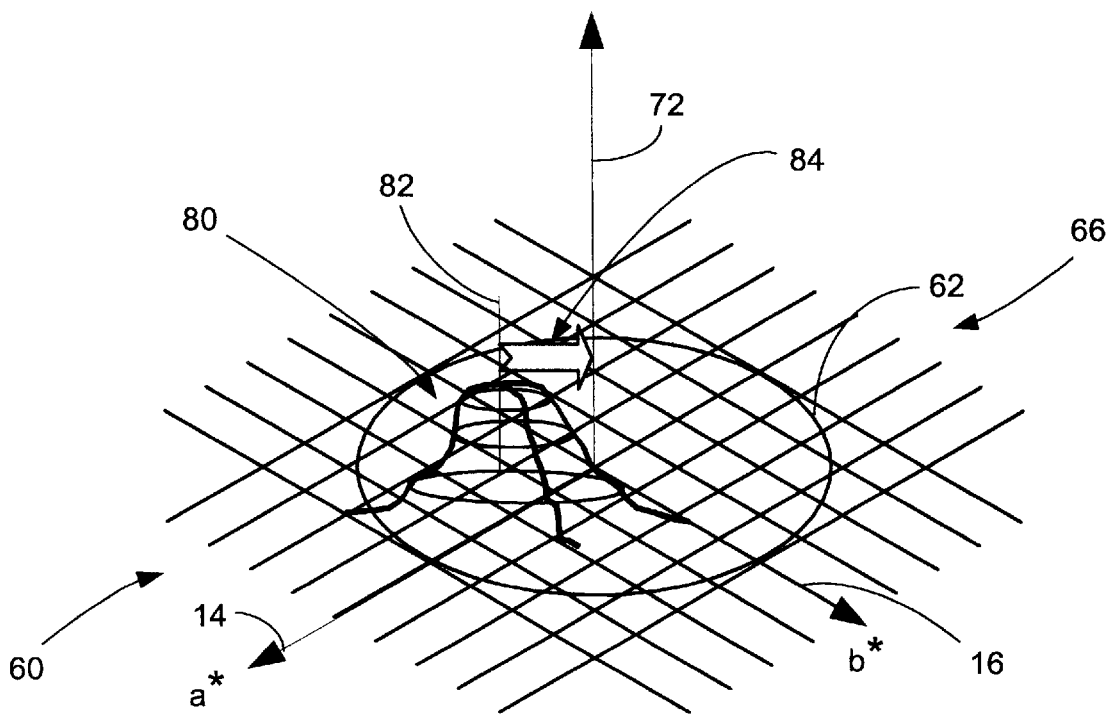
FIG. 7 schematically shows the color cast detection and removal method of the present invention.

Referring now to FIG. 7, therein is schematically shown the color cast detection and removal method, the bin method 34 of the present invention described in the same space as FIG. 6. Triple peaks touching one another in the neutral-color core 62 are formed into a single, dominant chromatic peak 80 having a centroid 82. The direction of color cast removal to return to the "gray world" in the neutral-color core 62 is shown by the arrow 84, and the color cast distance is the distance the centroid 82 is moved, as indicated by the length of the arrow 84. The contents of each color bin are moved individually to the achromatic axis 12 to accomplish the movement of the centroid 82. It should be noted that many statistical and size restrictions must be met before the single chromatic peak 80 is considered a cast.

After three iterations, the same objects are repeatedly identified with nearly identical shapes. The importance of varying the initial luminance and chrominance bin ranges lies in identifying intricate near-neutral-color objects with widely varying reflectance surfaces. When the goal of using the current algorithm is the segmentation of objects in an image, then initial bin range variation is a more significant parameter set than chromaticity radius.

Once the required parameter set is modified, the entire method is repeated. The option exists for the pixel selection stage to resample all of the original near-neutral-pixels in the image, or to use the reduced set of pixels currently placed in segmented objects. Using the entire image pixel set yields slightly more accurate cast removal results. Using only the segmented object pixels allows significantly faster processing time. If the purpose of the algorithm is to segment image objects, then narrow initial bin ranges are selected. Also, the entire pixel set must be used to permit needed object growth. If broad initial bin range selections are selected, then the use of pixels currently placed in segmented objects greatly enhances processing speed without any noticeable deterioration of shape accuracy.

After an iteration is complete, the algorithm measures the change in the adjusted parameter set(s). When the new change is below a certain threshold, the iterations stop. At this point, the current version of the global chrominance histogram map 70 is analyzed. If there are multiple chromatic peaks in random directions, then the algorithm surmises that no chromatic shift exists in the image. The logic associated with this decision is that the different chromatic peaks exhibited by at least two near-neutral-color objects in different chromatic quadrants could not result if there were a global color cast. While minor casts could still be present with these two objects, they typically are not visually significant.

When there is only one chromatic peak of the histogram map, or multiple peaks all in the same quadrant of the chosen chromaticity color space, then there is a high likelihood that a color cast is present. The average baseline of the chrominance histogram map is defined as the average bin pixel number in the near-neutral-color chromaticity plane when the major peaks are removed. The algorithm next questions if the pixels involved in the single chromatic peak are greater than a selected multiplicative threshold value times the average baseline. This basically is questioning if the chromatic peak of an object is above the noise level of near-neutral-color region. While not being limiting, a multiplicative threshold value of ten (10) times the average baseline has been found to be acceptable. If the answer is true, then the algorithm assumes a cast, which is equal to the radius to the single chromatic peak. For multiple chromatic peaks in the same quadrant, the cast is the mean radius to each of the peaks. The correction is to subtract this amount of chromaticity from all the objects found in the segmentation method. Effectively this shifts the "white to black point axis" back to the achromatic axis. Of course no white point or black point objects are moved (because they may have been compromised by the initial white balance operation). Only the near-neutral-color objects that comprise the ¼ to ¾ color If a chromatic peak's pixel count does not exceed multiplicative threshold value of 10 times the baseline, the algorithm imputes that no cast is present. Many properly exposed pictures have near-neutral-color objects with definite color signatures. But statistically there will also be other objects with different color signatures. Averaging all of the picture's large near-neutral-color objects should produce multiple peaks in different quadrants or a single peak very close to the chromatic axis. Any image with all peaks less than a given threshold from the neutral-color axis, is considered chromatically neutral-color and not corrected. The algorithm allows the user to override this assumption so as to make small cast changes when the image content dictates it. Oftentimes this relates to images with strong flesh tones present. Many flesh tones can fall within the near-neutral-color object definition. In such cases, it is generally best not to correct the color cast because it adversely affects the final skin tone. More will be discussed about this later.

The algorithm performs other tests for image anomalies. If the average chromaticity of all of the near-neutral-color objects exceeds a certain threshold, then the algorithm imputes that the image is of a very colorful subject and stops. This would be the example of the "red barn" image. Once the color cast distance has been determined, the algorithm subtracts this chromaticity amount from the segmented objects, as indicated in FIG. 7.

As shown in FIG. 3, a three-dimensional LUT (lookup table) is used is used in the "transform entire image via 3D LUT" block 52, which transforms input RGB values to final output RGB values. At every LUT table coordinate, the input RGB values for the LUT are transformed into the luminance and chrominance color space coordinates. These transformed coordinates are compared to each of the bin average colors. When there is a match, then the color cast chromaticity is subtracted from the average value (with clipping applied). The resulting values are re-transformned back to RGB. An entry is made in the LUT to show the resulting increase or decrease in the RGB output values. Interpolations and smoothing are applied to the LUT to insure no "spike" corrections cause noticeable artifacts in the finale image. The LUT is written to permanent storage so that it can be analyzed and/or applied to other images that are known to have the same chromatic cast problems.

Before and after color images of color cast removal demonstrate the effectiveness of bin method 34 of color cast detection and removal of the present invention. For test purposes, the scenes were chosen to illustrate the wide variances in appearance that can result from fixed illuminant sources found in the MacBeth light booth. The bin method 34 has been tested on 200 natural scene images. Outdoor daylight images taken with various DSC devices show small "red case" changes that take place in clouds, cement sidewalks, and asphalt. The changes are subtle but observable. The strongest cast removal results for outdoor images come from sunset conditions when dominant red and orange is present.

On indoor natural images, flash and fluorescent lighting oftentimes generate green casts. The bin method 34 provides excellent identification and correction of such natural scenes. In mixed lighting situations, the cast removal appears incomplete compared to the results of single illuminant experiments. This probably results from the situation where some near-neutral-color objects are illuminated by daylight and others by fluorescent. In the global chrominance histogram map 70 the two objects would exhibit two spectral peaks (one for each illuminant type), which may be diverse enough to have each peak come from a different color quadrant. In such cases, the bin method 34 would refrain from making a strong correction. In these situations, the segmentation information can provide the spatial coordinates of each object. An analysis could be performed to group near-neutral-color objects by their image coordinates. A weighted differentiation between groups of near neutrals would provide a correlation between location and unique color cast. In this case, two separate cast removals could be performed to balance each set of objects by their mean localized color.

For the bin method 34, the L*a*b* color space was chosen because it seemed that perceptual uniformity would be needed to detect and correct subtle casts. The floating point and cube root requirements of L*a*b* certainly decreased processing speed. Typical processing times for a 320 by 240 RGB image on a 233 MHz Pentium Windows machine is 7 seconds (with no optimization for programming undertaken). It should be noted that larger image sizes did not increase the determination of cast coordinates or the accuracy of segmentation. It was found that 100 by 75 pixel images were adequate to detect moderate casts (a*, b* radius of 12 units or more for 8-bit coordinate codes). However, the determination of segmentation for real scenes was strongly limited in the 100 by 75 pixel case because 8-way connected objects tend to break away from each other at that resolution. Empirically, the 320 by 240 pixel image gave the best segmentation versus processing time, and a cast determination vector radius accuracy of 2 units.

To investigate how dependent the algorithm was upon choice of color space. "YUV" was selected because of its popularity in JPEG compression schemes. The transformation from RGB linearized coordinates is:

$$\begin{bmatrix} Y \\ U \\ V \end{bmatrix} = \begin{bmatrix} 0.299 & 0.587 & 0.114 \\ -0.16875 & -0.33126 & 0.5 \\ 0.5 & -0.41869 & -0.08131 \end{bmatrix} \times \begin{bmatrix} R \\ G \\ B \end{bmatrix} \quad (1)$$

and for the inverse transform:

$$\begin{bmatrix} R \\ G \\ B \end{bmatrix} = \begin{bmatrix} 1.0 & 0.0 & 1.402 \\ 1.0 & -0.34413 & -0.71414 \\ 1.0 & 1.772 & 0.0 \end{bmatrix} \times \begin{bmatrix} Y \\ U \\ V \end{bmatrix} \quad (2)$$

While YUV requires three by three matrix multiplies, it is still roughly 19% faster than L*a*b*. The 320×240 pixel images require typically 5.6 seconds to method in the same environment. The chromatic axis vector for cast removal is nearly identical to the L*a*b* results. However, there are significant differences in the segmentation results. YUV results are coarser because it typically finds fewer near-neutral-color objects. Of those found, the pixel areas are roughly equivalent. Without the cube root differentiation offered by the L*a*b*, the chromatic coordinates of YUV show significant increases in quantization noise when creating the initial color bins. After two iterations, the YUV placement of the dominant chromatic peak becomes equivalent to the L*a*b* results.

The last choice in color spaces is the "Lst". A simple chromatic space, transforms RGB to L, s, t by simple additions and divisions:

$$L=(R+G+B)/3 \quad (3)$$

$$s=R/(R+G) \quad (4)$$

$$t=R/(R+B) \quad (5)$$

The primary use for this algorithm is in systems trying to quickly find flesh tones in natural images. While the chromatic axes are very crude and coarse, the algorithm yields almost perfect correspondence using 50% more iterations than the L*a*b* color space. It should be noted that s goes from 1 to 0 in the R and G plane, while t does the same thing in the R and B planes. In tests, the coarseness in chromatic variation of s, t required additional iterations to slowly stabilize on a chromatic cast vector. But once stabilized, the same visual effect on the corrected image was observed. The speed of Lst was roughly 5.13 seconds for the 320×240 pixel image environment. Most of the processing time in this algorithm was consumed by the sorting routines with very little expended on the color space calculations.

Like the YUV results, the Lst produced rather crude segmentation results that slowly converged on a stable description of the near-neutral-color objects. It was most interesting that the flesh tone objects were not immediately captured by the Lst color space. Rather, the facial tones were distributed across approximately twice the number of color bins as the L*a*b* and YUV systems. Given the rather minor increase in processing speed offered by Lst color space, the conclusion was reached that a LUT enhanced L*a*b* algorithm could be made as fast as Lst. The increased convergence to a stable chrominance cast distance and the enhanced segmentation results made L*a*b* the preferred mode.

Initially, flesh tones presented a problem because during the initial algorithm development, wide preliminary bin range parameter sets were used on the luminance and two chrominance channels. This resulted in segmentation covering 80% of all pixels in a typical image and all flesh tones being selected as near-neutral-color objects. If early iteration stages were cast corrected, the flesh tone objects would lose some of their yellow-orange chrominance. The results were immediately obvious and quite objectionable. Subsequent development allowed the use of narrow ranges for luminance and chrominance channels, which rapidly converged on the minimum common chrominance vector. This greatly decreased occurrences of skin tones in the final near-neutral-color objects. To safe guard against a "desaturation" of skin tones, a software module was used to detect the presence of flesh tones in segmented objects and to reduce chrominance subtraction. The general area of flesh tones as defined in the literature was used along with special case instances found in the image database.

While the need to use the flesh tone module is not required, it has a very useful property. Once the segmentation bins have been populated, the use of flesh tone discrimination via the software module can be used to find human faces, arms, and hands. The segmentation bins contain the centroid of their pixel distribution. An additional exploratory module was created to determine if a bin's pixel distribution matched an ellipsoid and to estimate its major and minor axis. Only for the flesh tone bins, the module would determine if it could belong to a face using standards for human head major to minor axis ratios. Even with noise from lost pixels, eyeglasses, and jewelry, the face detector showed reasonable performance. The tests were limited to frontal face instances only. After the estimated height of the head was determined, the program would examine the region where a person with that size head would have his/her neck, arms, and hands located. Some success was found in searching the other flesh tone bins to find objects at these locations that would correspond to neck, arm, and hand objects to determine if an accurate count of the number of people in a well-exposed image could be performed.

The use of segmentation helped identify the spatial location of large near-neutral-color objects. The goal was to attempt to locate light so lit exterior windows, and daylight sky. The bin method 34 proved very reliable in identifying and discriminating large near-neutral-color objects. Curved objects with varying brightness were quickly classified and placed in one or two color bins. Iterations through the bin method 34 allowed the region merger of bins in which changing color characteristics were consistent with an object undergoing significant lighting changes.

The ability to merge regions of an image based on the region's chrominance is a significant feature of the present invention. The adjustment of the initial ranges for luminance and chrominance is critical in collapsing objects with texture and low-level patterns. Simultaneous with the initial bin ranges is a parameter set describing the absolute maximum chrominance range that any single bin may possess. This set permits 8-way connected bins and regions to merge into one another. Currently the algorithm holds the absolute maximum chrominance growth of a bin constant until the chrominance vector of the near-neutral-color object group has stabilized. It is believed that early iterations with narrow bin ranges for luminance and chrominance can help classify the content of the image into two proposed classes. The first belongs to images with a few very large objects, and the second class looks for many small and randomly oriented objects. Based on the knowledge of these two classes, it should be possible to implement specialized bin growth characteristics that focus on finding the few key objects that are the subject matter of the image.

In conclusion, the current algorithm quickly determines if a color cast is present in a relatively small image (on the order of 200 by 300 pixels). Any color space having one luminance and two chrominance axes can find the chromaticity vector which represents the displacement of large near-neutral-color objects from the achromatic axis. Experimentally, L*a*b* worked the most robustly of the three color spaces tested to find a stable chromaticity vector. Once the measure of this vector was taken, a simple ICC-like profile is generated to remove the color cast appearance from the image.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters set forth herein or shown in the accompanying drawings are to be interpreted in an illustrative and non-limiting sense.

The invention claimed is:

1. A method of color cast detection and removal comprising the steps of:

providing a color image consisting of pixels;

providing a color space having an achromatic axis and two chromatic axes;

providing a default gray radius from the achromatic axis;

establishing bins of neutral color in a chromatic plane;

populating the bins with the pixels based on pixel chromaticity;

computing a color histogram with chromaticity peaks for the pixels in the bins within the default gray radius;

adjusting the default gray radius to a gray radius based on the chromaticity peaks in the color histogram;

detecting color cast from a dominant chromaticity peak within the gray radius and color cast distance from the distance thereof from the achromatic axis;

removing the color cast from the pixels by subtracting the color cast distance from the color image in the color space; and outputting a color cast removed color image.

2. The method as claimed in claim 1 wherein the step of computing a color histogram includes steps of:

designating groups of adjacent pixels in the color image; and eliminating groups of adjacent pixels which do not have the majority of the pixels with similar chrominance values whereby only large objects of near-constant reflectance will be processed.

3. The method as claimed in claim 1 wherein the step of computing a color histogram includes a step of:
   establishing ranges of chrominance values; and
   compacting the bins by joining bins having a proximate range of chrominance values.

4. The method as claimed in claim 1 wherein the step of computing a color histogram includes the steps of:
   establishing ranges of colors;
   sorting the bins to determine the connection of the pixels therein to other pixels in other bins having the proximate range of colors;
   establishing segmentation bins for containing connected pixels having the proximate range of colors;
   populating the segmentation bins with connected pixels having the proximate range of colors; and
   calculating the centroids of the segmentation bins.

5. The method as claimed in claim 1 wherein the step of computing a color histogram includes the steps of:
   establishing ranges of colors;
   sorting the bins to determine the connection of the pixels therein to other pixels in other bins having the proximate ranges of colors;
   establishing segmentation bins for containing connected pixels having the proximate range of colors;
   populating the segmentation bins with connected pixels having the proximate range of colors; and
   detecting spaces between the segmentation bins whereby boundaries of objects in the color image are determined.

6. The method as claimed in claim 1 wherein the step of computing a color histogram includes the steps of:
   establishing ranges of colors;
   sorting the bins to determine the connection of the pixels therein to other pixels in other bins having distal ranges of colors;
   establishing segmentation bins for containing connected pixels having the proximate range of colors;
   populating the segmentation bins with connected pixels having the proximate range of colors; and
   detecting spaces between the segmentation bins having non-adjacent ranges of colors whereby boundaries of high chromaticity objects in the color image are determined.

7. The method as claimed in claim 1 wherein the step of adjusting the default gray radius includes the steps of:
   detecting chromaticity peaks proximate the default gray radius; and
   changing the gray radius to include the chromaticity peaks proximate the default gray radius.

8. The method as claimed in claim 1 wherein the step of adjusting the default gray radius includes the steps of:
   detecting chromaticity peaks proximate the default gray radius; and
   changing the gray radius to include the chromaticity peaks proximate the default gray radius.

9. The method as claimed in claim 1 wherein the step of adjusting the default gray radius includes the steps of:
   detecting chromaticity peaks proximate the default gray radius; and
   changing the initial bin range of chrominance.

10. The method as claimed in claim 1 wherein the step of adjusting the default gray radius includes the steps of:
    detecting chromaticity peaks proximate the default gray radius; and
    changing the maximum growth of any bin from an initial bin range of chrominance.

11. The method as claimed in claim 1 wherein the step of adjusting the default gray radius includes the steps of:
    detecting chromaticity peaks proximate the default gray radius; and
    recomputing the color histogram for the pixels in the bins within the gray radius.

12. The method as claimed in claim 1 wherein the step of adjusting the default gray radius includes the steps of:
    establishing ranges of colors;
    sorting the bins to determine the connection of the pixels therein to other pixels in other bins having the proximate ranges of colors;
    establishing segmentation bins for containing connected pixels having the proximate range of colors;
    populating the segmentation bins with connected pixels having the proximate range of colors;
    detecting chromaticity peaks proximate the default gray radius; and
    recomputing the color histogram for pixels in the segmentation bins within the gray radius.

13. The method as claimed in claim 1 wherein the step of computing a color histogram includes the step of:
    determining the existence of dominant chromaticity peaks in different chromatic quadrants in the color space to prevent the step of removing the color cast.

14. The method as claimed in claim 1 wherein the step of computing a color histogram includes the steps of:
    eliminating the dominant chromaticity peak from the computing of the color histogram when the amplitude thereof is less than a multiplicative threshold value times greater than the average amplitude of the non-dominant chromaticity peaks.

15. The method as claimed in claim 1 wherein the step of providing a default gray radius includes the step of:
    selecting a color space from a color space selected from a group consisting of L*a*b*, YUV, and Lst.

16. The method as claimed in claim 1 wherein the step of removing the color cast includes the step of:
    building a lookup table having corrections for the color cast distance; and
    transforming the color image using the lookup table to provide the color cast removed color image.

17. A method of color cast detection and removal comprising the steps of:
    providing a color image consisting of pixels;
    providing a color space having an achromatic axis and two chromatic axes;
    providing a default gray radius from the achromatic axis;
    establishing bins of neutral color in a chromatic plane;
    populating the bins with the pixels based on pixel chromaticity;
    computing a color histogram with chromaticity peaks for the pixels in the bins within the default gray radius;
    adjusting the default gray radius to a gray radius based on the chromaticity peaks in the color histogram;
    detecting color cast from a plurality of chromatic peaks in the same chromatic quadrant within the gray radius and color cast distance from the mean average distance thereof from the achromatic axis;
    removing the color cast from the pixels by subtracting the color cast distance from the color image in the color space; and
    outputting a color cast removed color image.

18. The method as claimed in claim 17 wherein the step of computing a color histogram includes steps of:

designating groups of adjacent pixels in the color image; and eliminating groups of adjacent pixels which do not have greater than ¾ of the pixels with similar chrominance values whereby only large objects of near-constant reflectance will be processed.

19. The method as claimed in claim 17 wherein the step of computing a color histogram includes a step of:

establishing ranges of chrominance values; and compacting the bins by joining bins having a proximate range of chrominance and luminescence values.

20. The method as claimed in claim 17 wherein the step of computing a color histogram includes the steps of:

establishing ranges of colors;

sorting the bins to determine adjacent pixels therein to other pixels in other bins having the proximate range of colors;

establishing segmentation bins for containing adjacent pixels having the proximate range of colors;

populating the segmentation bins with connected pixels having the proximate range of colors; and calculating the centroids of the segmentation bins and total area of the adjacent pixels.

21. The method as claimed in claim 17 wherein the step of computing a color histogram includes the steps of:

establishing ranges of colors;

sorting the bins to determine the connection of the pixels therein to other pixels in other bins having the proximate ranges of colors;

establishing segmentation bins for containing adjacent pixels having the proximate range of colors;

populating the segmentation bins with adjacent pixels having the proximate range of colors; and detecting spaces between the segmentation bins whereby boundaries of objects in the color image are determined.

22. The method as claimed in claim 17 wherein the step of computing a color histogram includes the steps of:

establishing ranges of colors;

sorting the bins to determine the connection of the pixels therein to other pixels in other bins having distal ranges of colors;

establishing segmentation bins for containing adjacent pixels having the proximate range of colors;

populating the segmentation bins with adjacent pixels having the proximate range of colors; and detecting spaces between the segmentation bins having non-adjacent ranges of colors whereby boundaries of high chromaticity objects in the color image are determined.

23. The method as claimed in claim 17 wherein the step of adjusting the default gray radius includes the steps of:

detecting chromaticity peaks outside but proximate the default gray radius; and increasing the gray radius to include the chromaticity peaks outside but proximate the default gray radius.

24. The method as claimed in claim 17 wherein the step of adjusting the default gray radius includes the steps of:

detecting chromaticity peaks outside but proximate the default gray radius; and increasing the gray radius to include the chromaticity peaks proximate the default gray radius.

25. The method as claimed in claim 17 wherein the step of adjusting the default gray radius includes the steps of:

detecting chromaticity peaks outside but proximate the default gray radius; and changing the initial bin range of luminance and chrominance.

26. The method as claimed in claim 17 wherein the step of adjusting the default gray radius includes the steps of:

detecting chromaticity peaks outside but proximate the default gray radius; and changing the maximum growth of any bin from an initial bin range of luminance and chrominance.

27. The method as claimed in claim 17 wherein the step of adjusting the default gray radius includes the steps of:

detecting chromaticity peaks outside but proximate the default gray radius; and recomputing the color histogram for the pixels in the bins within the gray radius.

28. The method as claimed in claim 17 wherein the step of adjusting the default gray radius includes the steps of:

establishing ranges of colors;

sorting the bins to determine adjacent pixels therein to other pixels in other bins having the proximate ranges of colors;

establishing segmentation bins for containing adjacent pixels having the proximate range of colors;

populating the segmentation bins with adjacent pixels having the proximate range of colors;

detecting chromaticity peaks outside but proximate the default gray radius; and recomputing the color histogram for pixels in the segmentation bins within the gray radius.

29. The method as claimed in claim 17 wherein the step of computing a color histogram includes the step of:

determining the existence of two dominant chromaticity peaks in two different chromatic quadrants in the color space to prevent the step of removing the color cast.

30. The method as claimed in claim 17 wherein the step of computing a color histogram includes the steps of:

eliminating the dominant chromaticity peak from the computing of the color histogram when the amplitude thereof is less than a multiplicative threshold value times greater than the average amplitude of the non-dominant chromaticity peaks.

31. The method as claimed in claim 17 wherein the step of providing a default gray radius includes the step of:

selecting a color space from a color space selected from a group consisting of L*a*b*, YUV, and Lst.

32. The method as claimed in claim 17 wherein the step of removing the color cast includes the step of:

building a three-dimensional lookup table having corrections for the color cast distance; and transforming the color image using the three-dimensional lookup table to provide the color cast removed color image.

* * * * *